Nov. 13, 1928.
T. A. WILLARD.
MOTOR ATTACHMENT FOR MOTION PICTURE CAMERAS
Filed Feb. 10, 1923
1,691,419
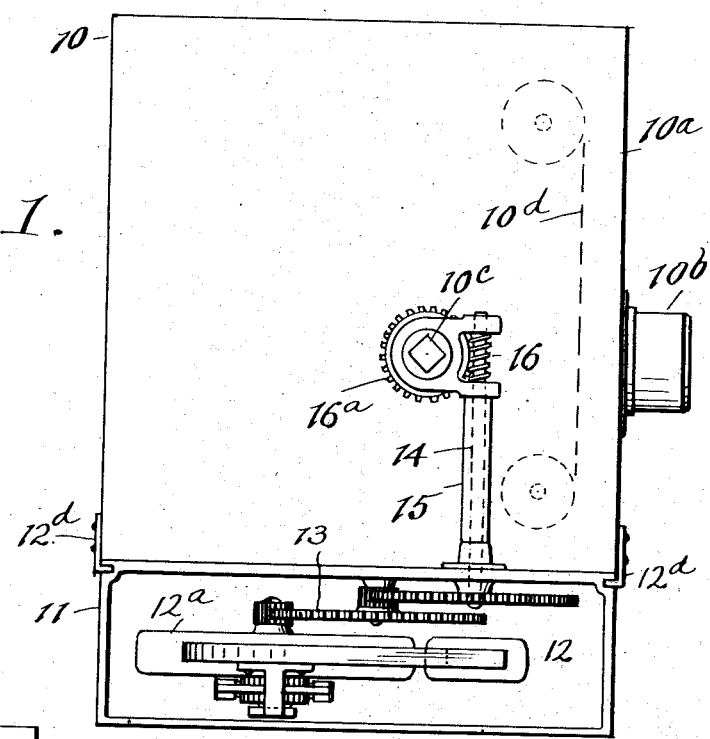
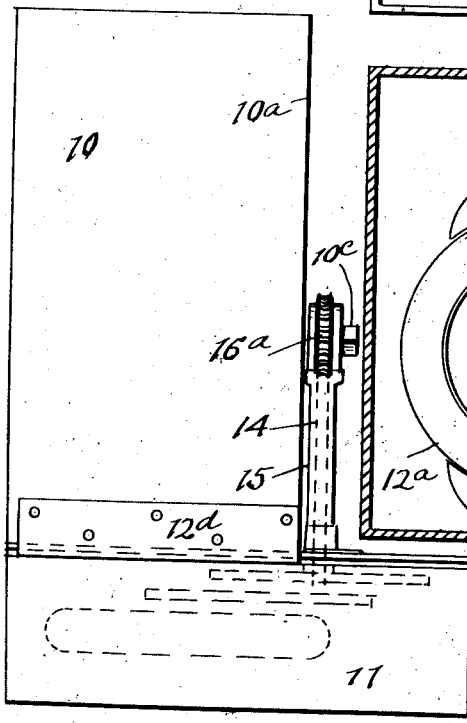
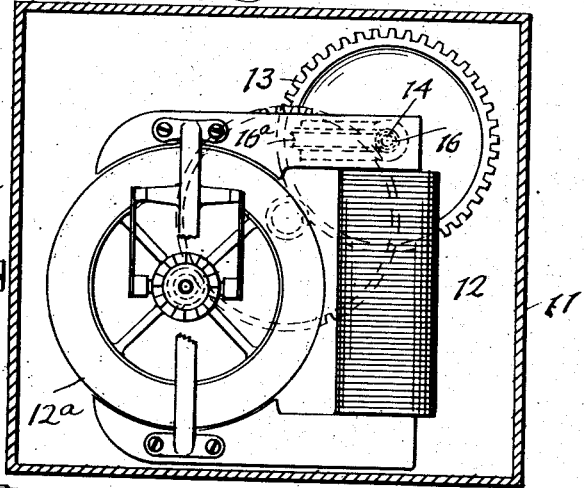

Patented Nov. 13, 1928.

1,691,419

UNITED STATES PATENT OFFICE.

THEODORE A. WILLARD, OF CLEVELAND HEIGHTS, OHIO.

MOTOR ATTACHMENT FOR MOTION-PICTURE CAMERAS.

Application filed February 10, 1923. Serial No. 618,261.

This invention relates to a motor attachment for motion picture cameras, and has for its object to provide a motor, preferably an electric motor, to operate the film feeding mechanism of the camera and thus do away with the usual hand cranking.

Though as far as certain features of my invention are concerned the motor mechanism may be a permanent part of the camera, still, in accordance with another feature of the invention this motor mechanism is in the form of a unit adapted to be attached to a camera, and to be removed therefrom, and when applied serving to rotate the shaft to which the hand crank is normally applied.

A further object is to provide a film feeding motor with its armature or rotary part arranged to produce a gyroscopic effect and thus stabilize the camera or prevent it from tipping when supported in the hands of the operator or on a light tripod.

Still further, the invention provides a motor for actuating the film feed mechanism, with the armature or rotary part of fairly large diameter and of sufficient weight or mass that it will have a good fly-wheel effect or action, thus permitting the regular fly-wheel to be removed if desired.

Other objects are attained by my invention, which may be here summarized as consisting in certain novel combinations and arrangements of parts which will be described in the specification and pointed out in the appended claims.

In the accompanying sheet of drawings, Fig. 1 is a side view of a camera to which my motor attachment has been applied, a part of the motor casing being removed; Fig. 2 is a similar view taken at right angles to the plane of view of Fig. 1, or looking toward the rear of the camera; and Fig. 3 is a bottom view of the motor mechanism with the casing thereof in section.

In the drawings, the camera and motor mechanism are both shown conventionally, no attempt being made to show the exact structure of the camera nor the exact structure of the motor mechanism, but I have endeavored merely to illustrate in as simple a manner as possible, the principal features of the invention, i. e. to illustrate how the electric motor may be applied as a unit to the camera and may be removed therefrom so as to enable the film feed mechanism to be actuated by the usual hand crank, and further to illustrate how the rotary part of the electric motor may be utilized to produce a stabilizing or gyroscopic effect, and may have also flywheel action.

Referring now to the drawings, 10 represents conventionally a motion picture camera, the film feeding mechanism of which is designed to be motor operated in accordance with my invention. This camera may have any suitable construction, the details of which I have not attempted to show. In this instance I have shown the casing $10^a$ and lens or lens holder $10^b$, the squared end of the shaft $10^c$ which projects from the side of the casing and to which the hand crank is ordinarily applied to operate the camera, i. e. to operate the film feeding and shutter mechanisms, and additionally I have indicated by dotted lines the film $10^d$.

In accordance with the present invention, the film feeding and shutter operating mechanism is operated by an electric motor which may be a permanent part of the camera, or may be in the form of an attachment applicable to and removable from the camera as a unit, and when applied, it preferably rotates the shaft $10^c$ to which the hand crank is normally applied as above stated. The motor may be located inside or outside of the casing 10. Preferably it is located on the exterior of the casing and preferably it is in the form of an attachment or unit adapted to be applied to the casing. In this case the motor or motor unit is, for reasons to be referred to presently, applied to the bottom of the camera, this unit as here shown including a casing 11 which is detachably secured to the bottom of the case by suitable securing devices such as illustrated at $12^d$. The casing 11 is shallow and flat and projects beyond one side thereof and overhangs the camera.

Inside the casing 11 is an electric motor 12 having an armature $12^a$ which rotates in a horizontal plane or about a vertical axis, and which is of fairly large diameter and of sufficient weight that when rotated at high speed in cranking or operating the camera, the armature will act as a fly-wheel and also as a gyroscope to hold the camera steady and prevent it being tilted or rocked when the camera is held in the hands of the operator, or on a light tripod, as previously explained. In order that this gyroscopic action may be obtained in the most effective manner, the flywheel is arranged to rotate horizontally, and to provide economy of space the motor or motor unit is arranged at the bottom of the camera.

A high speed motor being employed, it is, of course, essential that suitable speed reducing gearing be utilized between the armature and the shaft 10ᶜ of the camera. This speed reducing gearing includes spur gearing designated as a whole by the reference character 13, and located within the casing 11. Additionally the unit includes a shaft 14 which extends up alongside the camera case and is supported within a suitable sleeve 15 provided at the top with reducing gears, preferably spiral gears, including a gear 16 on the top of the shaft and engaging a gear 16ᵃ having a square hole which receives the squared end of the shaft 10ᶜ of the camera,—that is to say, when the motor mechanism or unit is slipped into place so as to obtain supporting connection with the camera casing, the gear 16ᵃ slips onto and forms driving connection with the shaft 10ᶜ.

It will be seen, therefore, that this attachment can be applied to a camera without disturbing its operating mechanism so that in the event it is desired to operate the camera by hand, this can be readily done by removing the motor mechanism or unit and by applying the hand crank to the shaft 10ᶜ in the usual manner.

In view of the fact that the motor armature is arranged not only to have a gyroscopic effect to steady the camera, but also has a fly-wheel action, the ordinary fly-wheel of the camera may be removed so that the motor attachment adds very little weight to the camera.

Any suitable source of current may be utilized to energize or operate the motor, but preferably the motor is operated from a small portable storage battery which may be placed within the camera, or may be supported on the camera outside of the case, or may be carried by the operator.

As before stated, I do not desire to be confined to any details shown, nor do I prefer to be confined to the precise arrangements illustrated, but aim in my claims to cover all modifications which do not involve a departure from the spirit and scope of my invention in its broadest aspects.

Having described my invention, I claim:

1. In combination with a motion picture camera having a shaft to which an operating crank is adapted to be applied, a film feeding motor attachment comprising a housing detachably secured to the camera, a gyroscopic electric motor carried within said housing, a shaft mounted on said housing, gearing at one end of said shaft cooperating with the shaft of the crank, and reduction gearing between the other end of the shaft and the motor.

2. In combination with a motion picture camera having a shaft to which an operating crank is adapted to be applied, a film feeding motor unit slidably mounted on the bottom of said camera, a gyroscopic motor within the unit adapted to operate a train of gears therein, a shaft secured to one of said gears and extending through the unit and provided at its opposite end with means for engaging and rotating the operating crank shaft.

In testimony whereof, I hereunto affix my signature.

THEODORE A. WILLARD.